United States Patent
Candia Cordeiro et al.

(10) Patent No.: US 10,661,510 B2
(45) Date of Patent: May 26, 2020

(54) AUTOMATED PROCESS FOR MANUFACTURING ITEMS OF FURNITURE IN AN INTEGRATED MANUFACTURING CELL AND INTEGRATED CELL FOR MANUFACTURING ITEMS OF FURNITURE

(71) Applicant: EMBRAER S.A., São José dos Campos-SP (BR)

(72) Inventors: Elton Candia Cordeiro, São José dos Campos (BR); Fábio Rodrigues Costa, São José dos Campos (BR); Gustavo Franco Barbosa, São José dos Campos (BR)

(73) Assignee: EMBRAER S.A., São José dos Campos-SP (BR)

( * ) Notice: Subject to any disclaimer, the term of this patent is extended or adjusted under 35 U.S.C. 154(b) by 372 days.

(21) Appl. No.: 15/529,715

(22) PCT Filed: Nov. 17, 2015

(86) PCT No.: PCT/BR2015/000173
§ 371 (c)(1),
(2) Date: May 25, 2017

(87) PCT Pub. No.: WO2016/082011
PCT Pub. Date: Jun. 2, 2016

(65) Prior Publication Data
US 2017/0326818 A1    Nov. 16, 2017

(30) Foreign Application Priority Data
Nov. 27, 2014    (BR) .............................. 102014029639

(51) Int. Cl.
B32B 41/00    (2006.01)
B29C 70/02    (2006.01)
(Continued)

(52) U.S. Cl.
CPC ............ B29C 70/023 (2013.01); B29C 65/48 (2013.01); B29C 70/24 (2013.01); B29C 70/68 (2013.01);
(Continued)

(58) Field of Classification Search
CPC ....... B29C 70/023; B29C 70/24; B29C 65/48; B29C 70/70; B29C 70/00; B29C 65/00; B29C 70/68; E04C 2/34
(Continued)

(56) References Cited

U.S. PATENT DOCUMENTS 3,328,218 A    6/1967    Noyes
5,832,594 A    11/1998    Avila
(Continued)

FOREIGN PATENT DOCUMENTS

DE    10 2005 024408    11/2006
DE    20 2009 001846    5/2009
(Continued)

OTHER PUBLICATIONS

International Search Report for PCT/BR2015/000173, dated Feb. 25, 2016, 4 pages.
(Continued)

Primary Examiner — Michael N Orlando
Assistant Examiner — Joshel Rivera
(74) Attorney, Agent, or Firm — Nixon & Vanderhye P.C.

(57) ABSTRACT

Patent of invention for "automated process for manufacturing items of furniture in an integrated manufacturing cell and integrated cell for manufacturing items of furniture". There is described an automated process for manufacturing items of furniture in an integrated manufacturing cell, the process comprising the following steps: a) Initial machining of plate (P) according to a manufacturing program, generating channels and holes; b) Installing inserts in the holes
(Continued)

generated in the initial machining and applying resin in at least one side hole of the insert; c) Applying edging resin inside the channels generated in the initial machining; d) Curing the edging resin and resin of the inserts in a heated environment; e) Final machining of plate (P) generating at least one item of furniture. There is also described an integrated cell for manufacturing items of furniture (100), comprising a machining station (200) and a curing station (50) associated with each other by way of a transfer module (30).

25 Claims, 13 Drawing Sheets

(51) Int. Cl.
  *B29C 70/70* (2006.01)
  *B29C 70/68* (2006.01)
  *B29C 65/48* (2006.01)
  *B29C 70/24* (2006.01)
  *E04C 2/34* (2006.01)
  *B29C 65/00* (2006.01)
  *B29C 70/00* (2006.01)

(52) U.S. Cl.
  CPC ............... *B29C 70/70* (2013.01); *E04C 2/34* (2013.01); *B29C 65/00* (2013.01); *B29C 70/00* (2013.01)

(58) Field of Classification Search
  USPC ............ 156/60, 64, 350, 351, 378, 379
  See application file for complete search history.

(56) References Cited

U.S. PATENT DOCUMENTS

2013/0014889 A1*  1/2013  Miller .................. B29C 70/30
                                            156/250
2013/0173043 A1   7/2013  Kudas et al.

FOREIGN PATENT DOCUMENTS

EP        2 067 570        6/2009
WO     WO 2013/009915      1/2013

OTHER PUBLICATIONS

Written Opinion of the ISA for PCT/BR2015/000173, dated Feb. 25, 2016, 7 pages.

* cited by examiner

AUTOMATED PROCESS FOR MANUFACTURING ITEMS OF FURNITURE IN AN INTEGRATED MANUFACTURING CELL AND INTEGRATED CELL FOR MANUFACTURING ITEMS OF FURNITURE

CROSS-REFERENCE TO RELATED APPLICATIONS

This application is the U.S. national phase of International Application No. PCT/BR2015/000173 filed Nov. 17, 2015 which designated the U.S. and claims priority to BR Patent Application No. 102014029639-5 filed Nov. 27, 2014, the entire contents of each of which are hereby incorporated by reference.

FIELD

The present invention refers to an automated process for manufacturing items of furniture in an integrated manufacturing cell, particularly used in the production of primary parts on a large scale and with precision and also refers to an integrated manufacturing cell that enables the performance of various types of operations on the items of furniture in an automated, integrated and precise manner, this integrated manufacturing cell being used in the automated process for manufacturing items of furniture.

DESCRIPTION OF THE STATE OF THE ART

The manufacture of furniture, particularly aeronautical furniture, makes use of a raw material made of fiberglass with epoxy resin and polyaramide. As fiberglass sheets with epoxy resin form outer surfaces which comprise, in the gap between the sheets, the polyaramide forming a porous, sandwich-like combination. This combination can also be made entirety of aluminum depending on the effort demanded by the item.

This process of manufacturing items of furniture that uses the fiberglass material or the aluminum comprises various steps that need to be carried out with precision so that the items produced have final measurements within the tolerance specifications, enabling precise encasement when building and installing furniture.

This is why various difficulties are found in the production of items of furniture known today, including the following: the long manufacturing cycles that result in tow productivity, high rates of scrap, rework and repair, high manpower cost and increasingly expensive end product, difficulty in guaranteeing the quality of the process and reliability of the results.

These drawbacks are the results of an almost artisan process of manufacturing items of furniture known in the state of the art. Since it is not automated, the already-known process of manufacturing items of furniture is labor intensive, since each operator is responsible for one of the many steps in the process. Accordingly, a significant lack of repetitiveness and tack of standardization of the steps is noted, as is a very protracted learning curve.

Additionally, the technologies employed in each step of manufacturing are obsolete, demanding much more physical effort from each operator, and sometimes this may lead to ergonomic problems.

An evaluation of the already-known methods of manufacturing items of furniture revealed a shortfall in automation and lack of integration between all the steps of the process. Furthermore, the manufacturing is performed using conventional, non-customized machines, requiring adaptations that adversely affect precision.

In this sense, the document of the state of the art CN101380748 describes an automated process for manufacturing sandwiched panels made of wood, paper and resin, that is, it describes the manufacture of the raw material for the items of furniture, but does not refer to the process of manufacturing these items of furniture per se.

Document CN 203062239 refers to a CNC (Computer Numerical Control) machining center, endowed with a working platform and various cutting and machining tools connected to a master control. It is possible to machine plates in series at this machining center, but the document does not describe the use of this machine for performing the specific steps of manufacturing items of furniture, such as installing inserts, resin curing, and final cut, among others.

Accordingly, although machining centers and automated machining methods already exist, it is not yet possible to find automated methods and customized and specific integrated manufacturing cells for manufacturing items of furniture, capable of integrating the various necessary steps, each having its own particular aspect.

OBJECTIVES OF THE INVENTION

It is therefore an objective of the present invention to provide an automated process for manufacturing items of furniture in an integrated manufacturing cell capable of integrating the necessary steps for this manufacturing.

It is also an objective of this invention to provide an integrated manufacturing cell capable of performing all the necessary operations for manufacturing a part all in one place and in an automated fashion.

BRIEF DESCRIPTION OF THE INVENTION

The object of the present invention is an automated process for manufacturing items of furniture in an integrated manufacturing cell, the process comprising the following steps:
a) Initial machining of a plate according to a manufacturing program, generating channels and holes;
b) Installing inserts in the holes generated in the initial machining and applying resin in at least one side hole of the insert;
c) Applying edging resin inside the channels generated in the initial machining;
d) Curing the edging resin and resin of the inserts in a heated environment;
e) Final machining of the plate generating at least one item of furniture.

Another object of the present invention consists of an integrated cell for manufacturing items of furniture, comprising a machining station and a curing station associated with each other by means of a transfer module.

SUMMARIZED DESCRIPTION OF THE DRAWINGS

The present invention will, hereinafter, be described in greater detail based on an execution example represented in the drawings. The drawings show:
FIG. 1 is a flowchart of the automated process for manufacturing items of furniture in an integrated manufacturing cell that is the object of this invention;

FIG. 2 is a general schematic view of the integrated cell for manufacturing items of furniture that is the object of this invention, wherein FIG. 2 depicts two such cells;

DETAILED DESCRIPTION OF THE INVENTION

Figure 2:
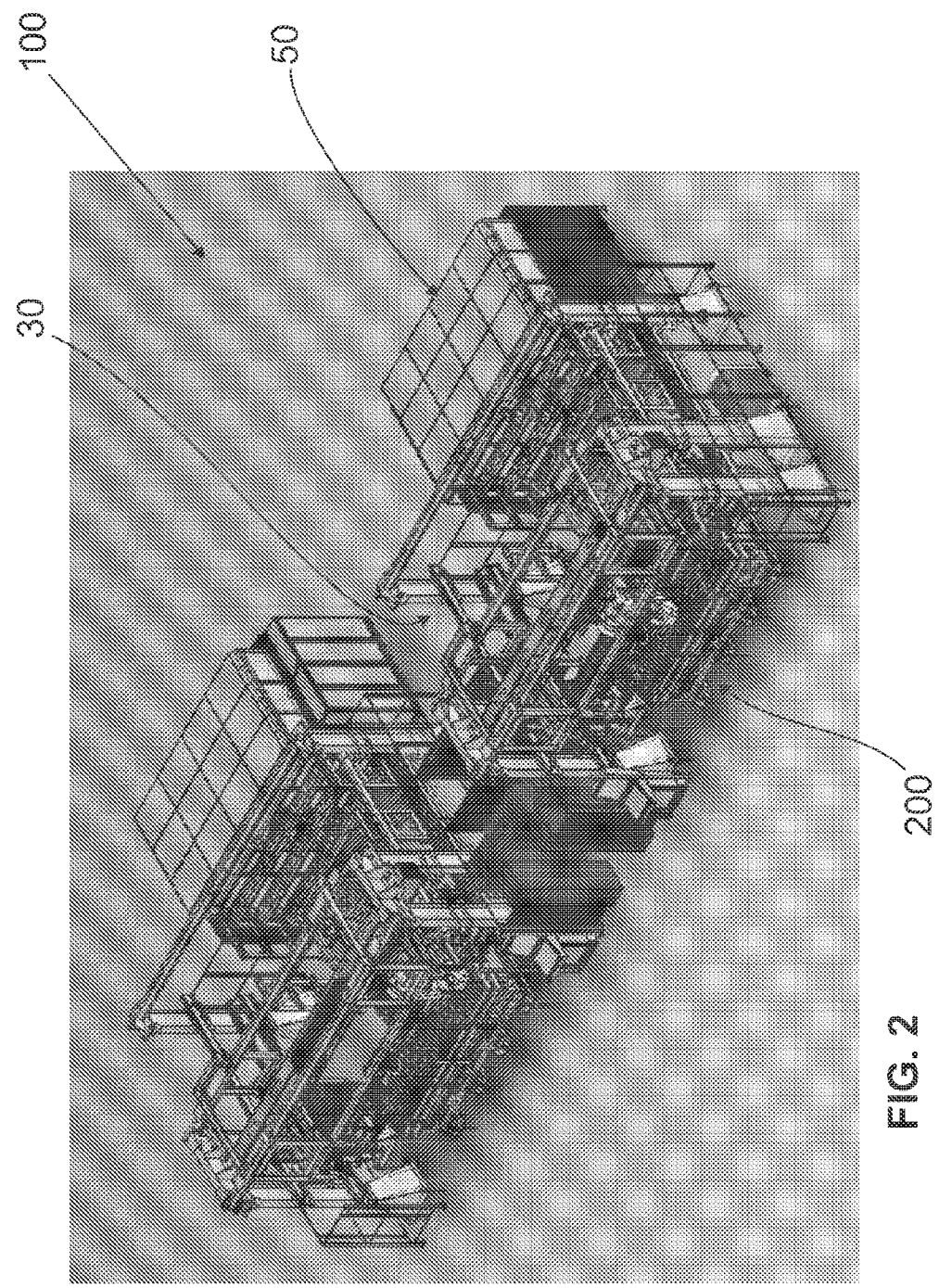

According to a main embodiment and as can be seen in FIGS. 2-15, an integrated cell for manufacturing items of furniture 100, object of this invention, comprises a machining station 200 and a curing station 50 associated with each other by way of a transfer module 30 (FIG. 2).

To coordinate all the functions of the components and stations of the integrated manufacturing cell 100, it comprises a supervisory system endowed with a manufacturing program. This manufacturing program is carried out by the operator of the integrated manufacturing cell 100 and comprises command instructions for all the components of the integrated manufacturing cell 100. Once the manufacturing program has been finalized and simulated, the data are inserted into the supervisory system which sends them to each element of the integrated manufacturing cell 100.

The machining station 200 illustrated in FIG. 2 comprises a portico 203 formed by horizontal structures 213, perpendicularly associated to vertical structures 214 which are fastened to the floor. Under the portico 203, more precisely under the horizontal structures 213, there is disposed a vacuum table 201, which receives and fastens work plate P.

Figures 3, 3A:
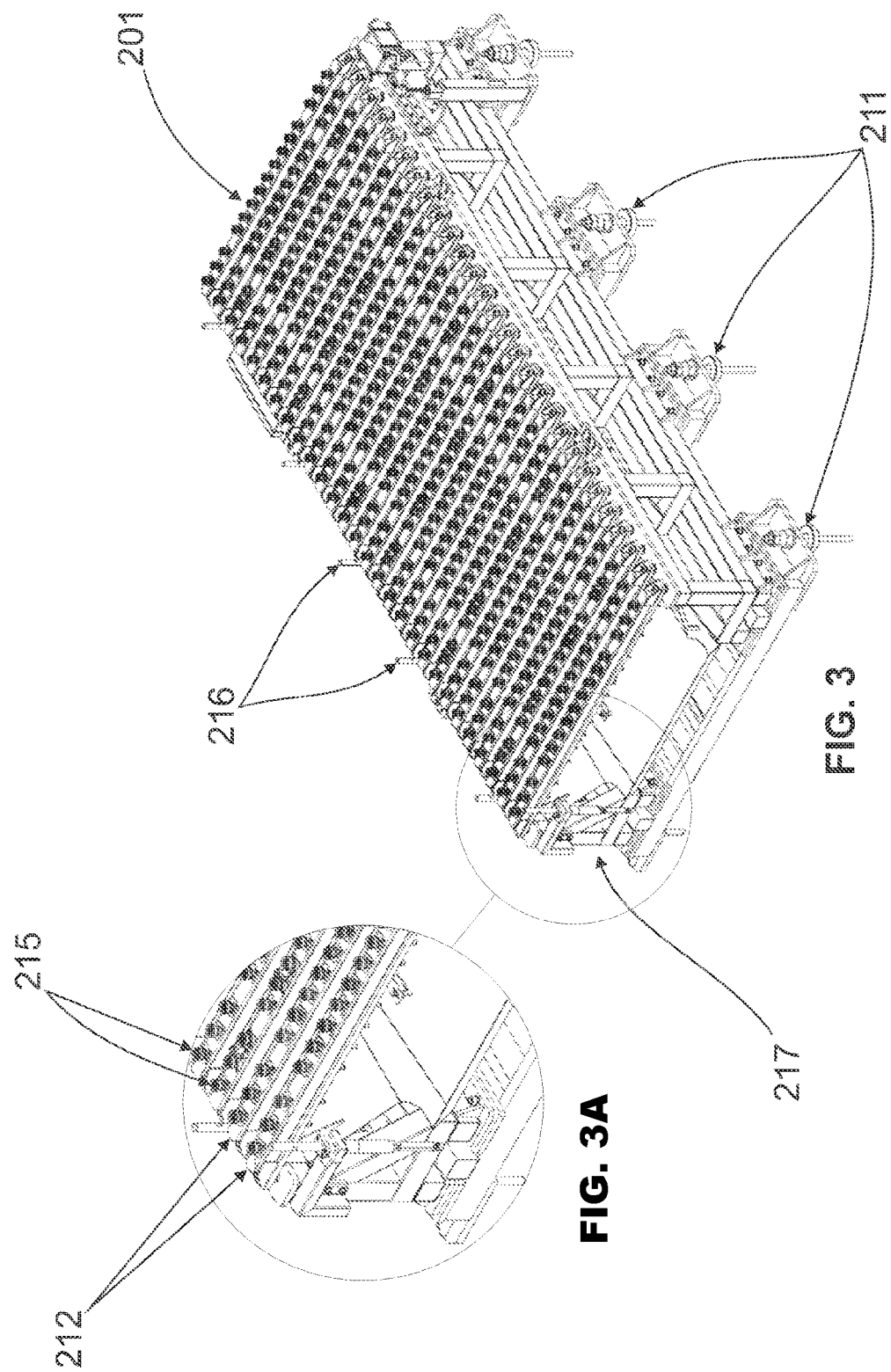
FIG. 3 and 3A are respectively overall and detailed perspective views of the vacuum table comprised in the integrated manufacturing cell.

As can be seen in FIG. 3 and 3A, this vacuum table 201 is formed by a plurality of sideward rods 212 parallel to each other, on which a plurality of vacuum nozzles 215 are installed. The rods 212 with vacuum nozzles 215 are supported on a supporting structure 217, securely fastened to the floor by way of multiple fasteners 211 disposed along the length of the table 201.

Along the upper surface of the vacuum table 201 there are disposed reference stops 216, used to assist the positioning of plate P during the referencing step of plate P, that is, when plate P to be machined is disposed on a vacuum table 201, the sides of this plate P are placed at the reference stops 216 which give the notion of alignment when plate P is withdrawn from the vacuum table 201 and returns thereto, for instance, after resin curing.

The vacuum nozzles 215 are disposed along the rods 212, side by side and so as to cover the entire surface of the vacuum table 201. The vacuum of these vacuum nozzles 215 makes them suction the surface of plate P keeping it securely fastened to the vacuum table 201 during the machining steps and other steps of the process.

The vertical structures 214 of the portico 203 support the horizontal structures 213 and assist in keeping the entire integrated manufacturing cell 100 rigid.

Figure 4:
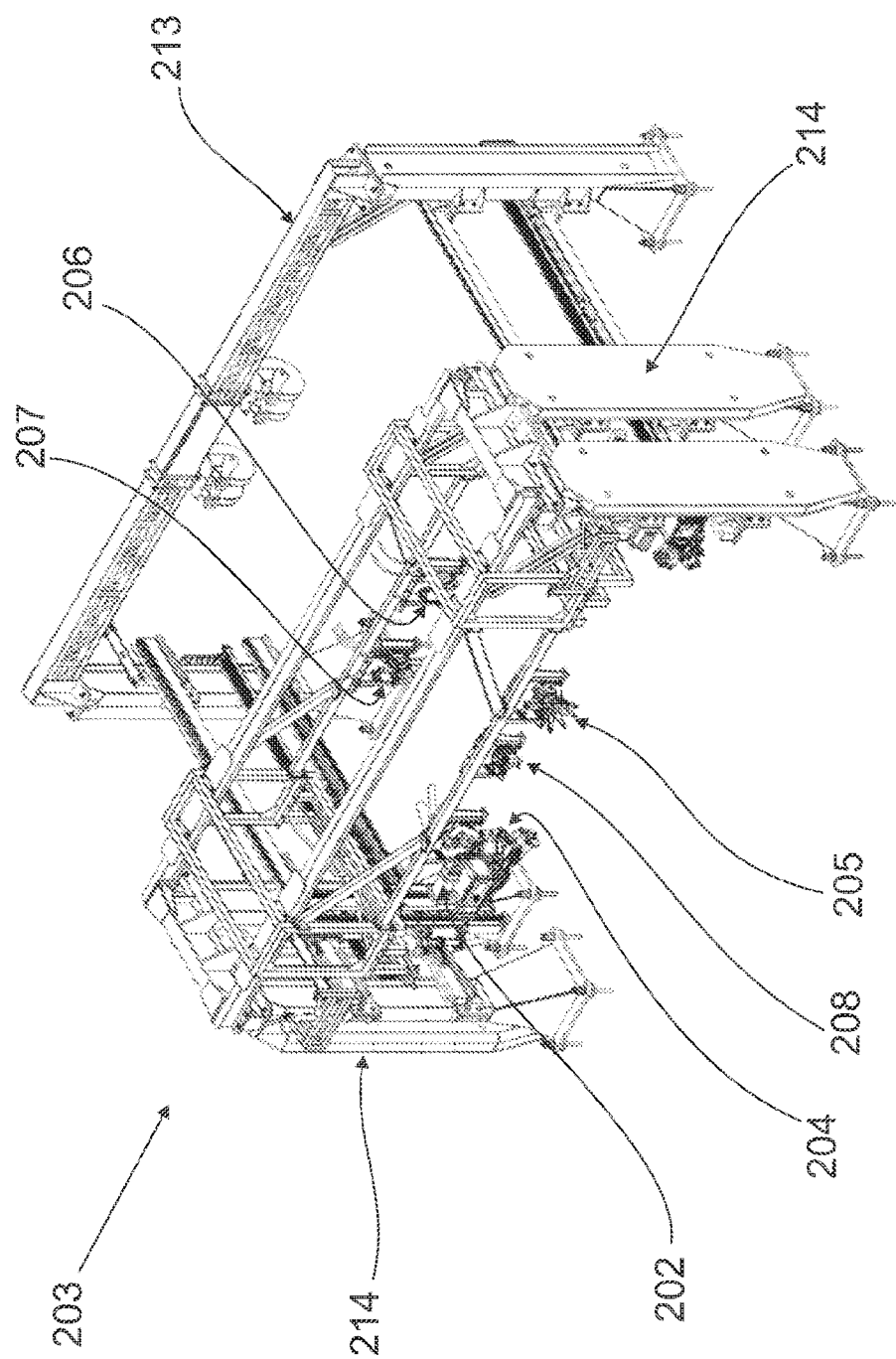
FIG. 4 is a perspective view of the portico comprised in the integrated manufacturing cell.

There are fastened on the horizontal structures 213 a robotic arm 202, a vision system 204, an insert manipulator 205, a machining mandrel 208, an insert resin applier 206 and an edging resin applier 207, as can be seen in FIG. 4.

Figure 5:
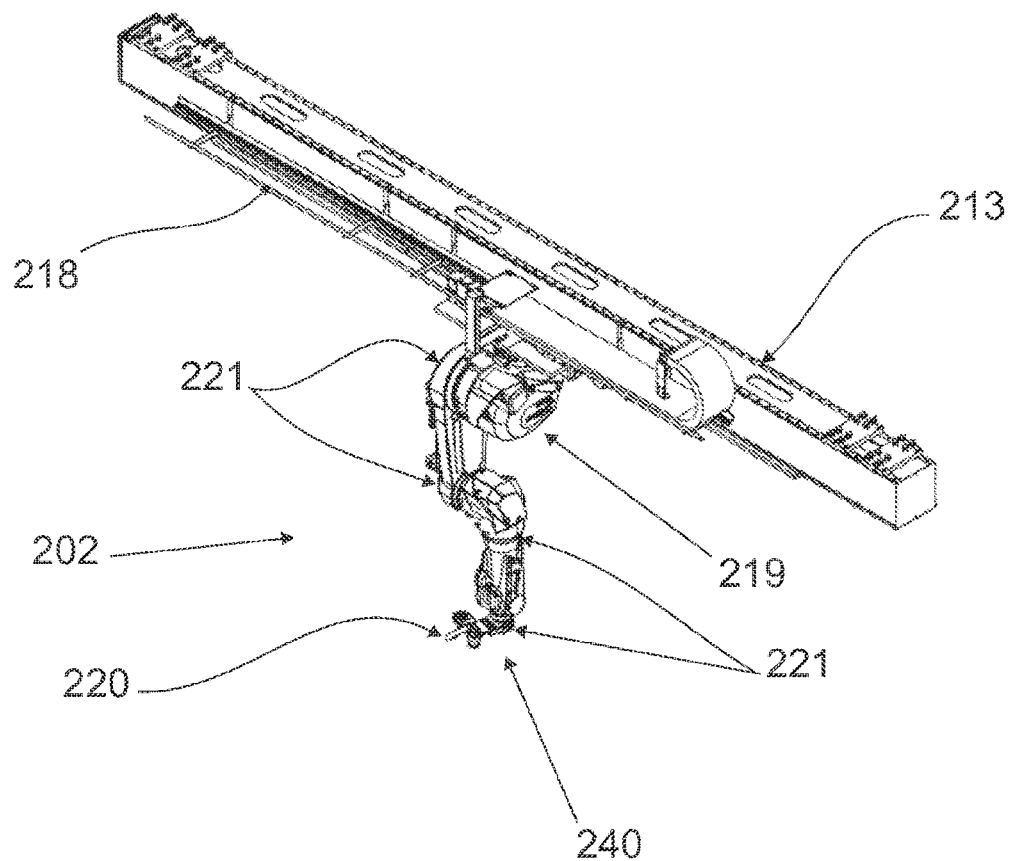
FIG. 5 is a perspective view of the robotic arm that is part of the integrated manufacturing cell.
Figure 6:
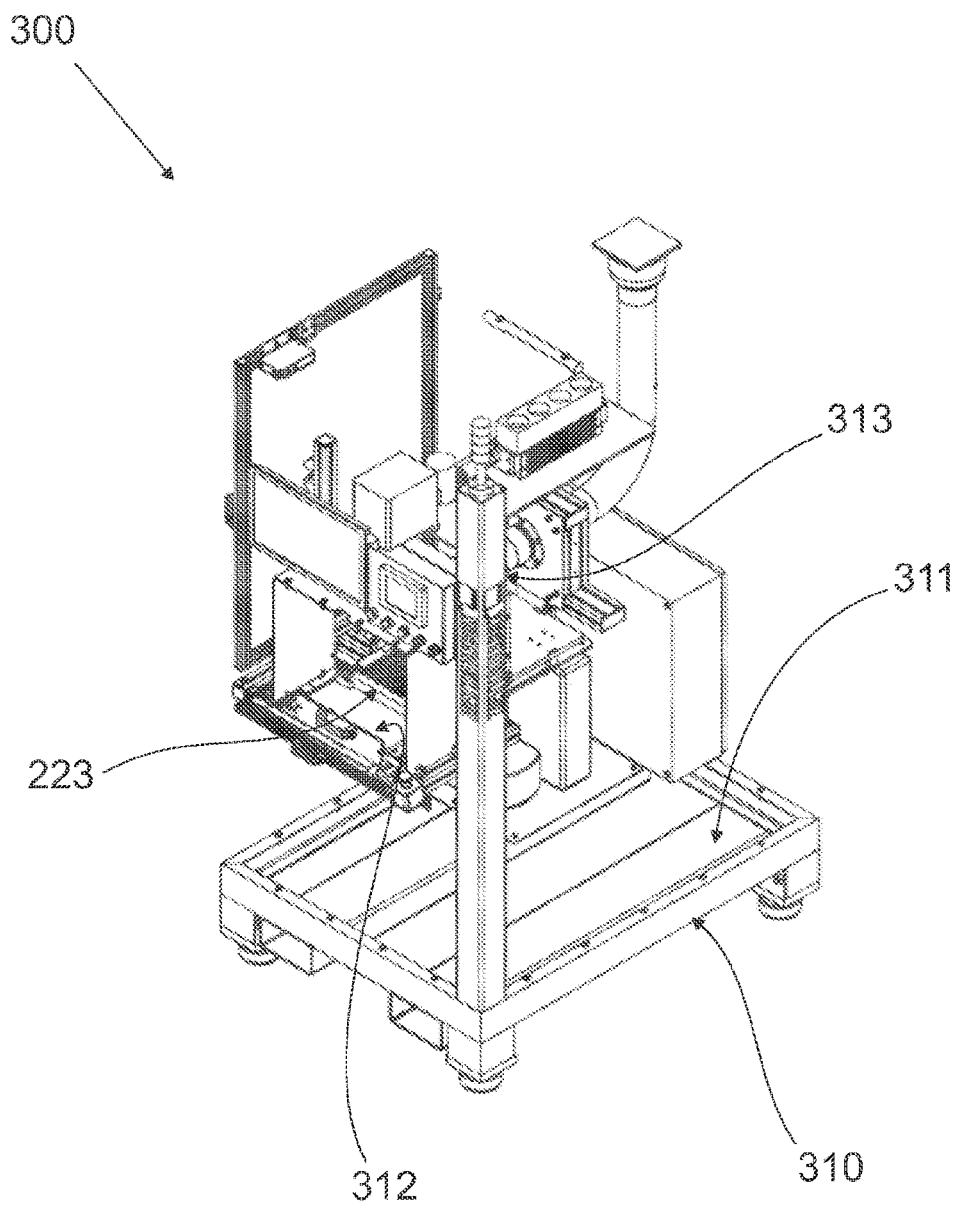
FIG. 6 is a first perspective view of the insert assembly device comprised in the integrated manufacturing cell.
Figure 7:
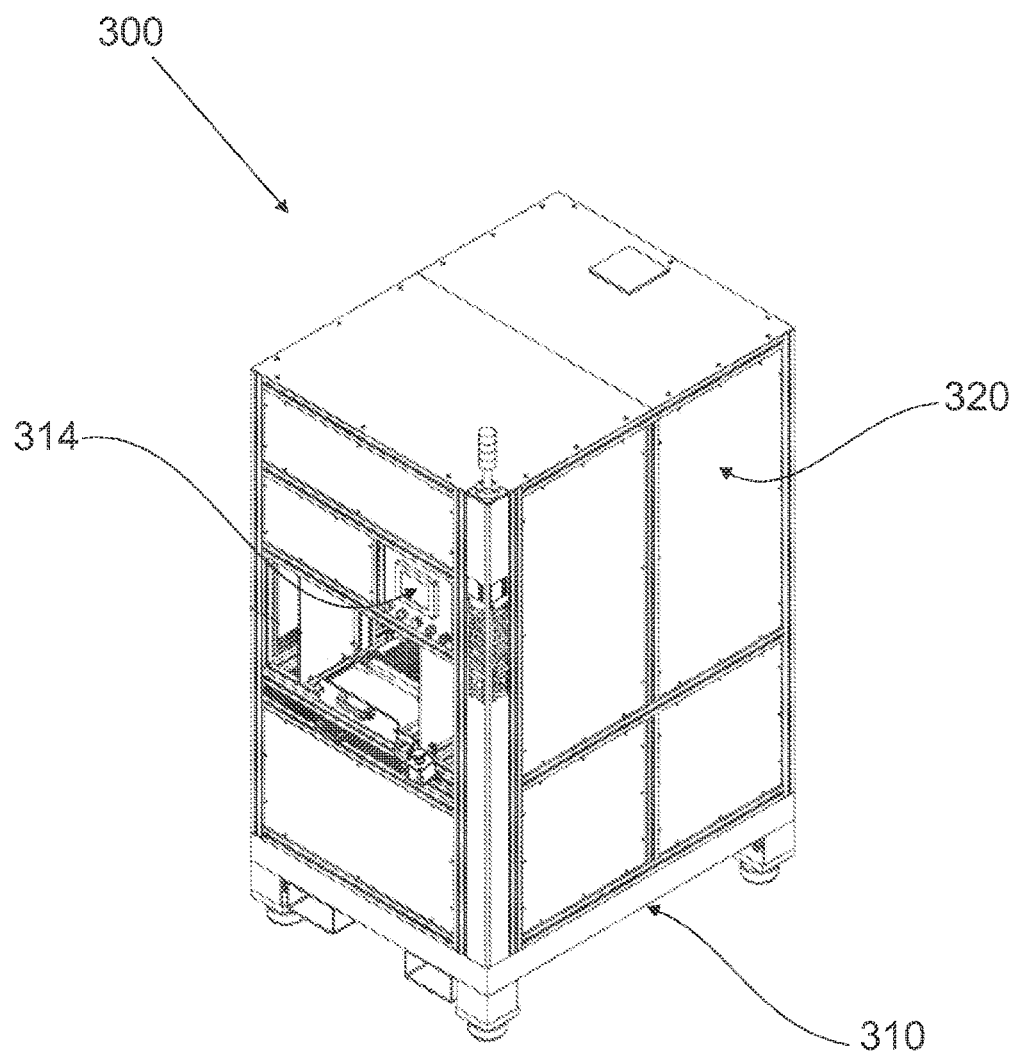
FIG. 7 is a second perspective view of the insert assembly device comprised in the integrated manufacturing cell.
Figure 8:
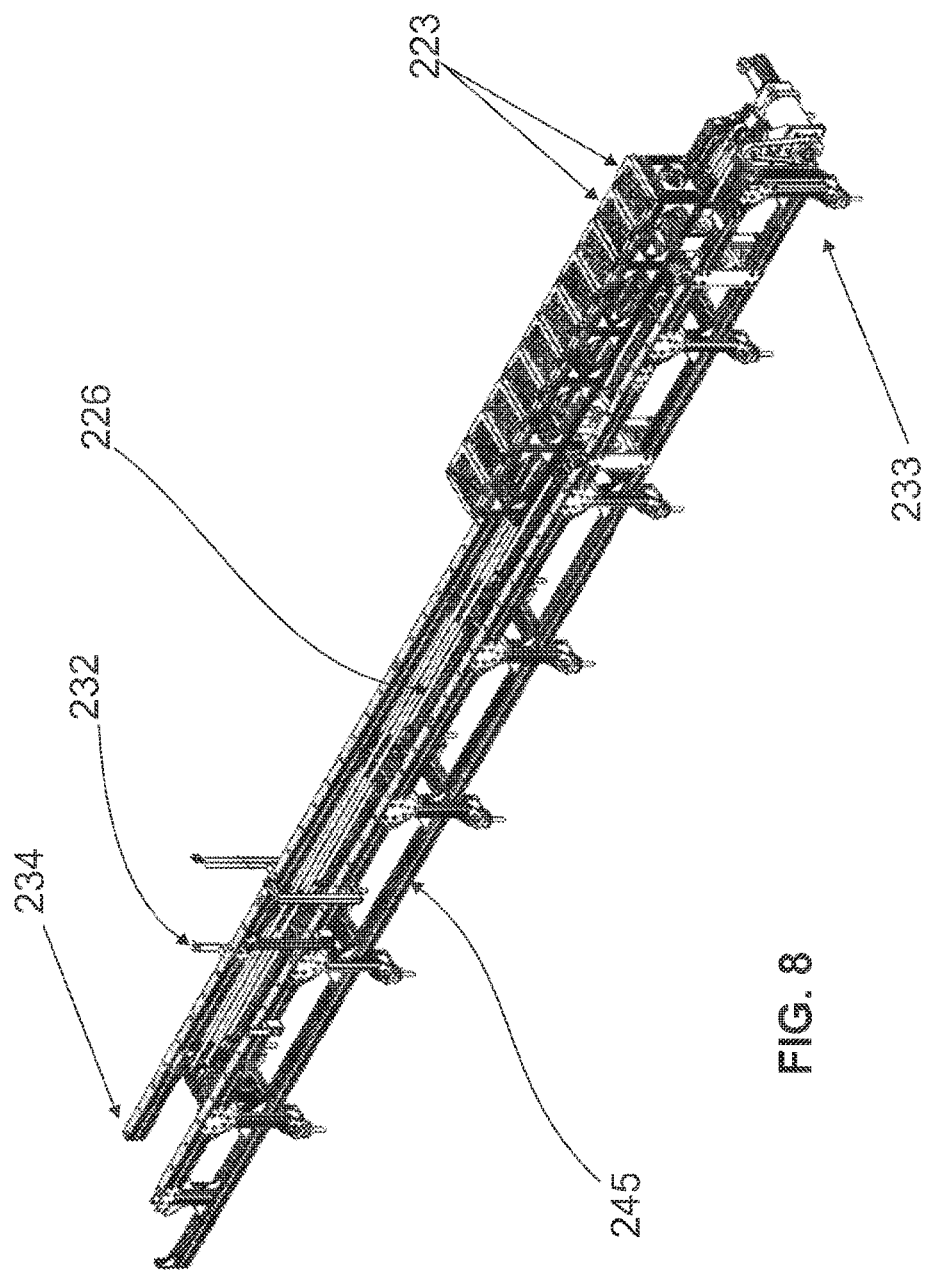
FIG. 8 is a view of the lead track that is part of the integrated manufacturing cell.

The robotic arm 202, illustrated in detail in FIG. 5, moves sideward on a track 218—which is also fastened to one of the horizontal structures 213 of the portico and angularly by means of pivots 221 or articulations which enable it to rotate. The sideward and angular movements can be simultaneous and occur above the vacuum table 201, where plate P is fastened. An electric motor 219 is responsible for relaying power to the robotic arm 202, enabling it to move sideward and angularly.

For the robotic arm 202 to grasp the toots required for manufacturing plate P, the robotic arm 202 comprises a grasping element 220 disposed at its free end 240, and which enables the encasement of this robotic arm 202 with the tools of the manufacturing process of the item of furniture depending on the operation to be carried out. Among others, these tools consist of the vision system 204, an insert manipulator 205, a machining mandrel 208, an insert resin applier 206 and the edging resin applier 207, all these tools necessary for the process of manufacturing items of furniture that will be described ahead.

Figure 11:
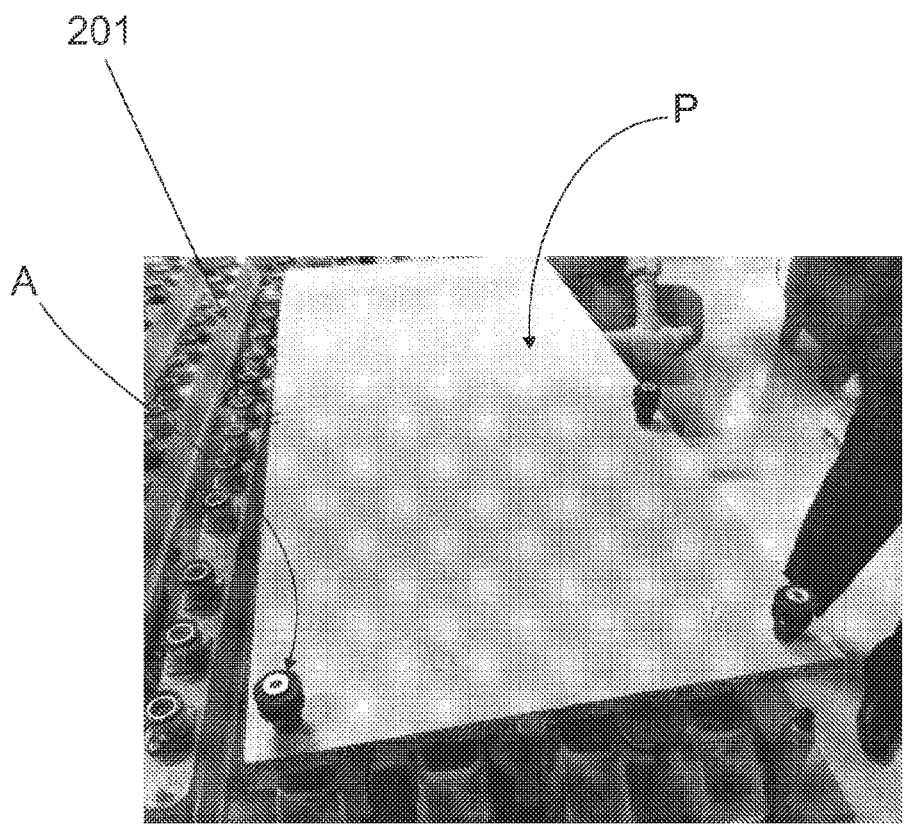
FIG. 11 is a photograph which illustrates a plate disposed on the vacuum table and endowed with targets of the vision system.
Figure 15:
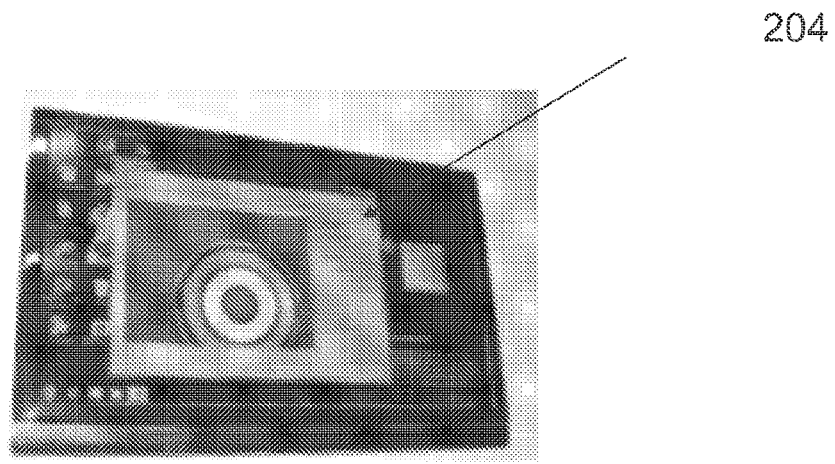
FIG. 15 is a photograph which illustrates the vision system that is part of the integrated manufacturing cell.

In this sense, the vision system 204 comprises means of identifying targets A which, during the manufacturing process of the item of furniture are fastened to plate P. More specifically, the vision system 204 consists of an optical system formed by a camera which is guided by the robotic arm 202 to targets A fastened to plate P (FIG. 11). This camera visualizes targets A which are metallic and reflective, identifying them by way of a computer program inserted into the supervisory system of the integrated manufacturing cell 100 (FIG. 15). The data obtained by the vision system 204 from identifying targets A are sent to the supervisory system which can alter the manufacturing program based on the location coordinates of plate P.

Figure 16:
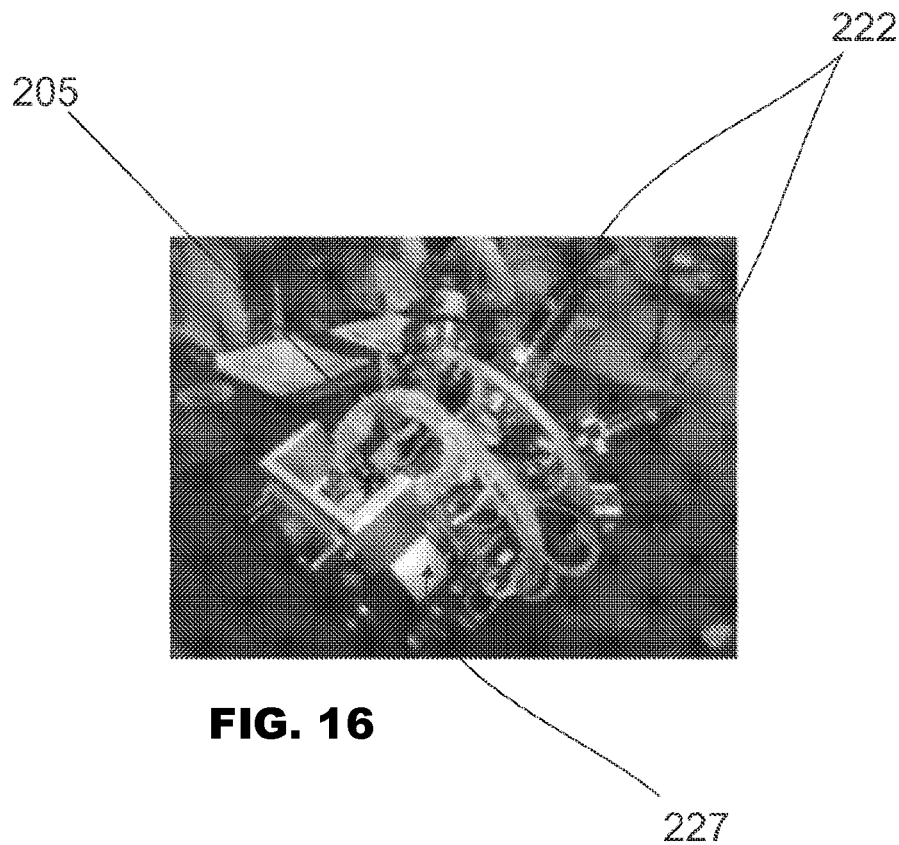
FIG. 16 is a photograph which illustrates the insert manipulator comprised in the integrated manufacturing cell.

The insert manipulator 205 is formed by a plurality of vacuum tips 222 interconnected amongst themselves and to a same base 227, such that as vacuum tips 222 turn as they grasp or release the inserts 230 as illustrated in FIG. 16. Therefore, by means of the grasping element 220, the robotic arm 202 carries the insert manipulator 205 and provides the rotation of the vacuum tips 222 to obtain or release the inserts 230 in certain places, that is, each vacuum tip 222 transports an insert 230 from a tray of inserts 223 to a hole in plate P by way of the robotic arm 202.

The machining mandrel 208 comprises a cutting tool of the milling type (not illustrated), used by the robotic arm 202 for the initial machining and final machining of the item of furniture. Following the commands of the manufacturing program, the robotic arm 202 associated to the machining mandrel 208, opens up channels and holes in plate P.

Additionally, the integrated manufacturing cell 100 comprises two types of resin appliers: the insert resin applier 206 and the edging resin applier 207. The insert resin applier 206 consists of a fine tip that inject resin into open holes on the side proximities of the holes that receive the inserts, whereas the edging resin applier 207 is a longer tip having a wider diameter, which fills with the appropriate resin the channels made in plate P during initial machining.

The machining station 200 of the integrated manufacturing cell 100 further comprises an insert assembly device 300 (FIGS. 6 and 7) which prepares a plurality of inserts 230 and provides them on a plurality of insert trays 223 (FIG. 13) which are then disposed on a guide track 226 (FIG. 8) for access by the insert manipulator 205 conducted by the robotic arm 202.

This insert assembly device 300 is formed by a support structure 310 covered by a protection lid 320 forming a machine separated from the integrated manufacturing cell 100. The support structure 310 comprises a supporting platform 311, on which there is a tray carrier of inserts 312 which receives the insert tray 223 to be prepared, a $CO_2$ laser set 313 and an adhesive film applier (not illustrated). The protection lid 320 covers the support structure 310 giving access to the insert tray carrier 312 and a panel with numerical commands 314 to set up the insert preparation parameters 230.

The insert trays 223 are standard-sized parallelipiped blocks, endowed with at least an RFD-type sensor 231 disposed on one of its corners and endowed with a plurality of through holes 241, each through hole 241 comprising a recess 242 having a larger diameter, concentric to the through hole 241 and having the function of acting as template for recutting an adhesive film which is applied to the inserts 230. The diameter of the through holes 241 vary from one inserts tray 223 to another owing to the different inserts 230 used in the items of furniture.

The guide track 226 comprises a supporting structure 245 fastened near the vacuum table 201 of the integrated manufacturing cell 100. This guide track 226 comprises a free end 233 and a clamped end 234. Positioned near the clamped end 234 is a reader 232 which identifies the passage of one inserts tray 223 through the sensor 231 disposed on this inserts tray 223. The data received by the reader 232 consists of information on the type and amount of inserts 230 disposed on the tray 223 and are sent to the supervisory system.

The supervisory system receives the data from the reading of the sensor 231 of the insert tray 223, identifies the type and amount of inserts 230 disposed on that tray 223 and, depending on the step of the manufacturing process of the part, sends a command to the robotic arm 202 for association with the insert manipulator 205 and conducts it to the site of the trays 223 so that each vacuum tip 222 obtains an insert 230 from the tray 223.

Figure 9:
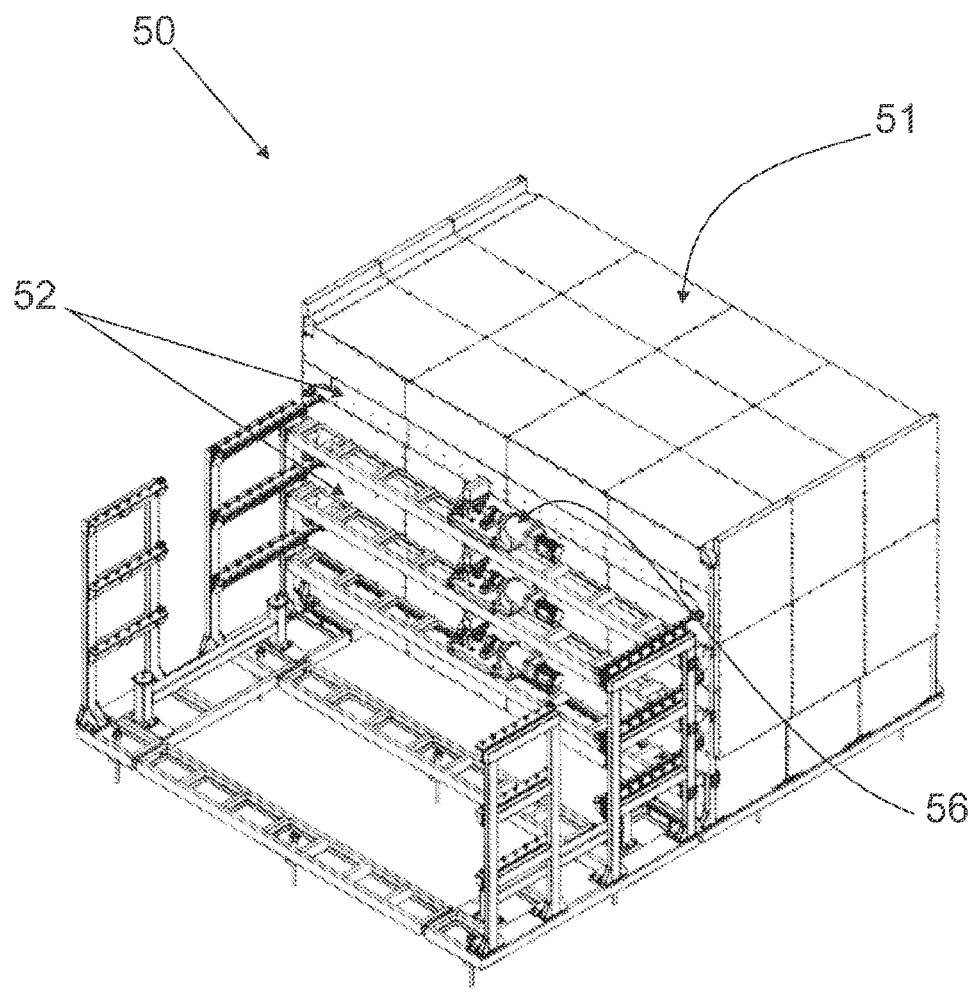
FIG. 9 is a perspective view of the curing station which is a part of the integrated manufacturing cell.

Besides the machining station 200, the integrated manufacturing cell 100 is also formed by the curing station 50 illustrated in FIG. 9.

The curing station 50 comprises at least an oven 51 endowed with multiple drawers 52 moved between open and closed position by means of an electric motor 56, one for each drawer 52.

Figure 12:
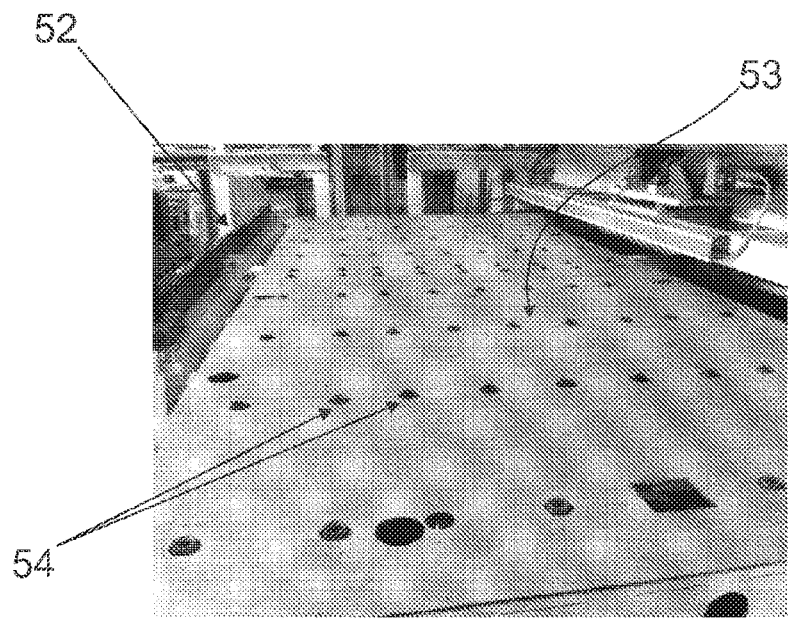
FIG. 12 is a photograph which illustrates a steel sheet disposed on the drawer of the oven of the curing station.
Figure 13:
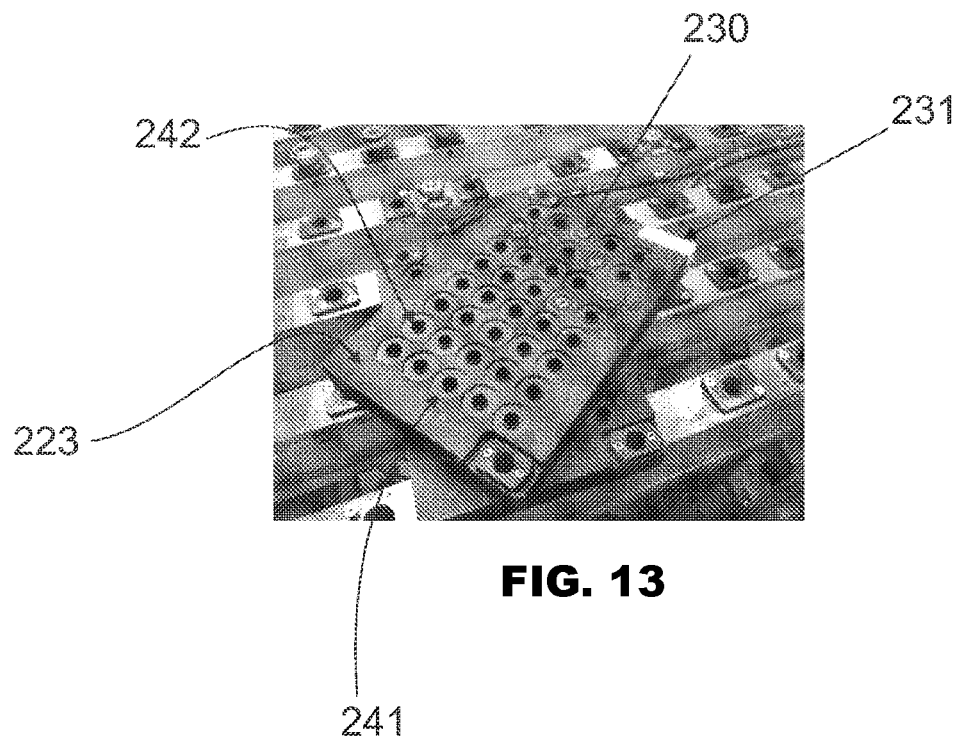
FIG. 13 is a photograph which illustrates an inserts tray containing representative inserts therein.

As can be seen in FIG. 12, each drawer 52 comprises, internally, a flat steel sheet 53 endowed with a plurality of vacuum points 57. When the plate P is disposed on the steel sheet 53 of the drawer 52 to be inserted into the oven 51, the vacuum points 57 apply a vacuum to the surface of plate P with which they are in contact, fastening it securely to the steel sheet 53. Accordingly, while plate P is curing inside the oven, it does not run the risk of warping, as it is kept fastened on a flat surface.

By virtue of the plurality of drawers 52, it is possible to insert into the oven 51 a plurality of plates P to cure the resin applied thereto during machining.

However, for machined plate P to be transferred from the machining station 200 to the curing station 50, a transfer module 30 must be used.

This transfer module 30 is disposed between the machining station 200 and the curing station 50 and is formed by a first frame 31 disposed parallel under a second frame 32.

Figure 10:
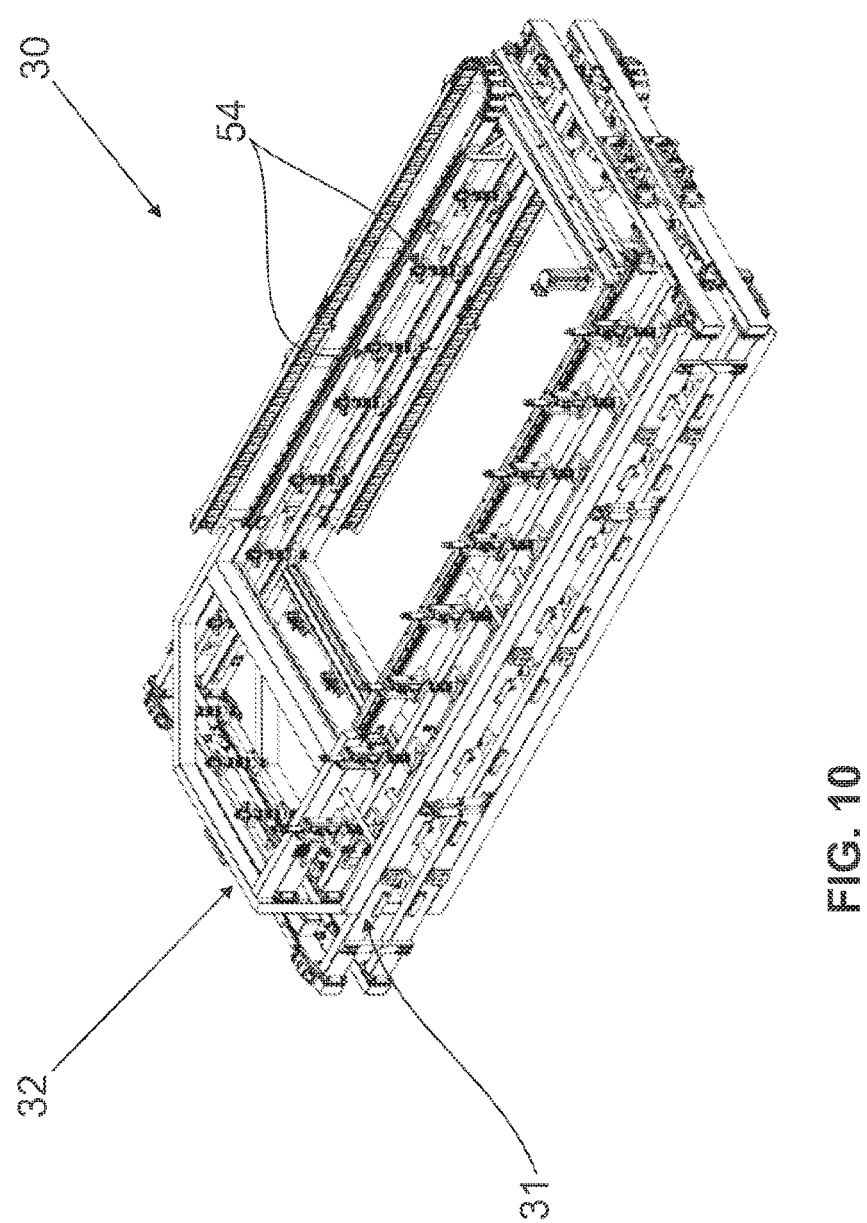
FIG. 10 is a perspective view of the transition module that is the object of the integrated manufacturing cell.

According to FIG. 10, the first frame 31 and the second frame 32 consist of metallic structures forming a rectangular framework of the frame type with a hollow center. Next to the longer side structures there is disposed a plurality of vacuum points 54 which fasten the plate P during transfer of plate P from the vacuum table 201 to the drawer 52 of the oven 51 or vice-versa.

In this sense, the second frame 32 transfers machined plate P from the vacuum table 201 to the drawer 52 of the curing station 50, for example, and afterwards, the same second frame 32 transfers plate P from the drawer 52 to the first frame 31, maintaining itself constantly fastened to plate P so as to form a combination: first frame (31), plate (P) and second frame (32). This combination is then rotated 180° such that the surface of plate P on which the resin was cured returns to the vacuum table 201 downwards, in contact with the vacuum nozzles 215, for the other surface of plate P to be machined.

Finalizing the turnover, the first frame 31 is now on the second frame 32 and carries out, according to the manufacturing program, the functions carried out in the prior cycle on the second frame 32.

Figure 1:
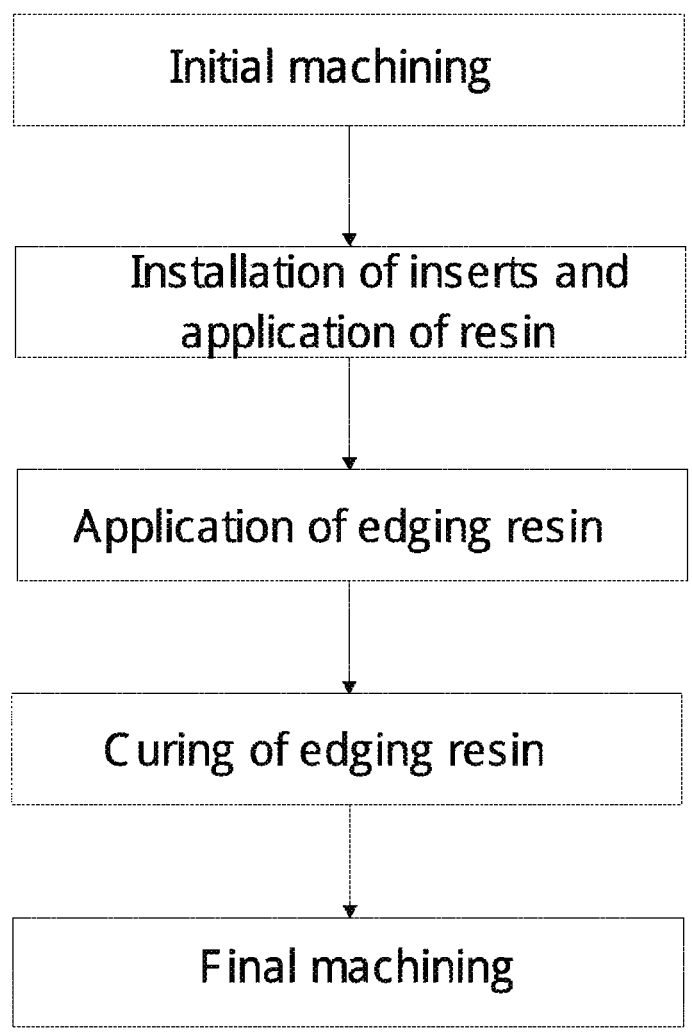

As can be seen in FIG. 1, the present invention also refers to an automated process for manufacturing items of furniture in an integrated manufacturing cell, and this process comprises the following essential steps:
 a) Initial machining of a plate P according to a manufacturing program, generating channels and holes;
 b) Installing inserts in the holes generated in the initial machining and applying resin in at least one side hole of the insert;
 c) Applying edging resin inside the channels generated in the initial machining;
 d) Curing the edging resin and resin of the inserts in a heated environment;
 e) Final machining of plate P generating at least one item of furniture.

Step a: Initial Machining of Plate P According to a Manufacturing Program, Generating Channels and Holes The initial machining of plate P is done by the robotic arm 202 using a machining mandrel 208, with plate P fastened to the vacuum table 201.

However, before positioning plate P on the vacuum table 201, the manufacturing program of the item of furniture is prepared and simulated through a specific software that generates a file, this file is loaded onto the supervisory system of the integrated manufacturing cell 100. This manufacturing program comprises commands and parameters of all the steps of the process.

Once the manufacturing program of the part is loaded onto the supervisory system, plate P is positioned on the vacuum table 201, at the stops 2016 that assist with the correct positioning of this plate P.

After insertion of the manufacturing program and with plate P positioned on the vacuum table 201, the referencing step of plate P occurs through optical system of the vision system 204. In this step, the robotic arm 202, using the machining mandrel 208, makes specific holes where targets A are fastened. These targets A are parts manufactured specifically for use of the vision system 204 and, as can be seen in FIG. 11, comprise a dark cylindrical body with a metallic cylindrical area, associated to an elongated neck that is screwed into the hole by the robotic arm 202.

With targets A positioned on the holes of plate P, the robotic arm 202 carries the vision system 204 to each of the targets A, identifies them and, accordingly, identifies the positioning of plate P on the vacuum table 201 to adjust the reference point (point zero). The references obtained are inserted into the supervisory system and the manufacturing program is updated or adjusted based on these coordinates.

Whenever plate P leaves the vacuum table 201 and returns to the vacuum table 201, the robotic arm 202 makes the reference of plate P by means of the vision system 204 cooperating with targets A.

With plate P positioned on the vacuum table 201 and referenced, the supervisory system corrects the positioning of the robotic arm 202 immediately prior to initial machining. By means of a software, a small difference (tenths of a millimeter) is corrected in the positioning of the robotic arm 202 caused by a minor deformation, but one that results in imprecise machining of plate P. The manufacturing program is altered based on this correction of positioning.

Having made this correction, the robotic arm 202 carries the machining mandrel 208 and performs the machining on plate P, according to the manufacturing program in the supervisory system. During this initial machining, channels and holes are generated along plate P.

Step b: Installing the Inserts in the Holes Generated in the Initial Machining and Applying Resin in at Least One Side Hole of the Insert Once the step of initial machining is finalized, the robotic arm 202 changes the machining mandrel 208 for the insert manipulator 205, goes to the inserts tray 223 next to the guide track 226 and carries the insert manipulator 205 with inserts 230 by way of vacuum.

Figure 14:
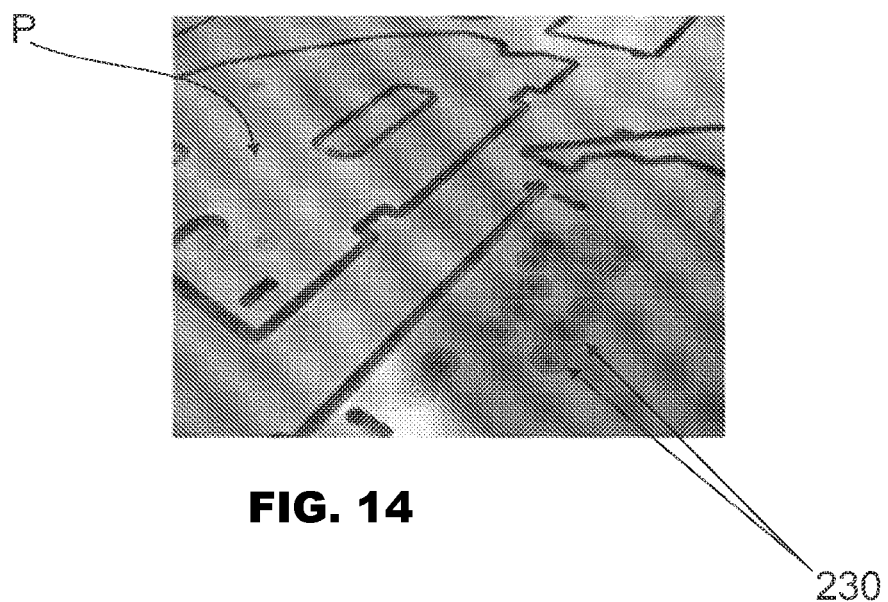
FIG. 14 is a photograph which the adhesives that fasten the inserts on the plate (P)

With the insert manipulator 205 loaded with inserts 230, the robotic arm 202 takes these inserts 230 to the specific holes generated in the initial machining, depositing one insert 230 in each hole (FIG. 14).

Since the inserts 230 comprise a cylindrical adhesive 243 glued to one of its outer surfaces, when this insert 230 is inserted into the holes of plate P the body of the insert 230 is inside the hole and the upper surface of the insert 230, which touches the surface of plate P, is covered by the cylindrical adhesive 243. This adhesive 243 guarantees the flatness of the upper surface of the insert 230 with the surface of plate P, since there may be through holes and blind holes on plate P.

After positioning the inserts 230 on the holes, the robotic arm 202 makes at least two holes on plate P, on the sides of each insert 230, very close to the hole that houses the insert 230. Thereafter, the robotic arm 202 carries the insert resin applier 206 and applies resin in one of these side holes. The resin spreads involving the insert 230 and glues it to plate P while the second hole acts as a vent for air to escape as the resin fills the hole.

Step c: Applying Edging Resin Inside the Channels Generated in the Initial Machining Once the inserts 230 are installed, the robotic arm 202 carries the edging resin applier 207 and crosses the length of the channels opened up on plate P during initial machining, completely filling these channels with resin. The function of this resin is to finish the edges of the part when it is cut in the final machining step.

In this step of applying the edging resin, a conventional machine pumps the resin and the catalyst in separate ducts, calculates the dose of each one and the flow for filling the channels of plate P. The resin is formed by glass microspheres to guarantee low density of this resin applied to plate P (about 0.58 g/cm$^3$), so as not to increase the weight of the final item of furniture.

The pumped resin and catalyst are conducted inside twenty meters of tubing until they reach the edging resin applier 207. In order for the glass spheres not to break during this transport, which would result in a significant increase in the density of the resin and increased weight of the furniture, a metallic tube is used, heated to approximately 40° C. to conduct the resin, guaranteeing greater fluidity of the resin and less attrition with the transport tubing walls.

The catalyst is transported in tubing made of rubber, and does not need to be heated.

The resin is mixed with the catalyst in the edging resin applier 207, just before it is deposited in the machined channel.

Step d: Curing the Edging Resin and Resin of the Inserts in a Heated Environment With the resin applied to the side holes of the inserts 230 and in the channels of plate P, this plate P is transported to an oven 51 for the step of curing the resin. Accordingly, the second frame 32 of the transfer module 30 moves to the vacuum table 201 and secures plate P by way of vacuum nozzles 54 which suction the surface of plate P keeping it fastened to the second frame 32. With plate P secured, the second frame 32 moves plate P to one of the drawers 52 of the oven 50 and deposits plate P on the metal sheet 53 with other vacuum nozzles 57. The vacuum nozzles 57 of the drawer 52 keeps plate P upright and fastened to the metal sheet 53. Upon curing, depending on the heat of the oven, the part needs to be well fastened on a rigid and flat surface to avoid warping.

Once inside the drawer 52, the edging resin and the resin of the inserts 230 are cured in the oven 50, at a temperature in the range from 40° C. to 55° C. for 1 to 3 hours.

Depending on the part, it is necessary to machine both sides of place P. In this case, after the curing step, plate P is rotated, by way of the transfer module 30, for machining the second side.

This rotation is made by the transfer module 30. The second frame 32 of the transfer module 30, with the use of vacuum nozzles 54, grasps plate P in the drawer 52, moves plate P to the area of the transfer module 30, positions plate P next to the vacuum nozzles 54 of the first frame 31, but does not release plate P whereby forming a combination (first frame, plate P and second frame) which is rotated 180° such that the unmachined surface of plate P faces upwards.

With the rotation, the first frame 31 is thereafter on a second frame 32. After the rotation, the second frame 32 is kept where it is and the first frame 31 moves on top thereof, taking with it plate P which is moved and positioned on the vacuum table 201, with the unmachined part facing upwards.

Plate P being positioned on the vacuum table 201, the robotic arm 202 again makes the referencing of plate P with the vision system 204 identifying targets A. The new positioning of place P is inserted into the supervisory system and the machining steps, installation of the inserts, application of the resin to the inserts, application of the edging resin and curing, already described in detail above are made an this second side of plate P.

Targets A are fastened on plate P at the start of the process and are only withdrawn when the part is finally cut, that is, targets A remain on plate P during all the steps, including the curing step. Additionally, the identification ends of targets A are identical under the vision system 204, therefore, when plate P is turned for machining on the other side, targets A are adjusted for referencing of plate P under the system.

Step e: Final Machining of Plate P Generating at Least One Item of Furniture

Therefore, after curing the resins applied to one or two sides of the plate P, it returns from the oven 50 to the vacuum table 201. The robotic arm 202 makes the referencing of targets A with the vision system 204 setting in the supervisory system the new positioning of plate P on the table 201. The robotic arm 202 then carries the machining mandrel 208 and machines the channels filled with resin to detach one or more parts from plate P.

This step comprises the real dimension cut of the part until half of the channel machined and filled with resin. Plate P is turned by the transfer module 30, referenced on the vacuum table 201 and the cut is finalized, detaching one or more parts from plate P.

The automated process for manufacturing items of furniture in an integrated manufacturing cell 100 and the very integrated manufacturing cell 100 are all part of the manufacturing procedures of primary furniture parts in a complete manner, since all the steps of the process are carried out in a same work station, the integrated manufacturing cell. The manufacturing program inserted into the supervisory system and the use of the robotic arm 202 guarantee precision and greater productivity to the manufacturing process, as well as enabling the achievement of finished parts at the end of the process. Therefore, the difficulties found in the currently known manufacturing processes of items of furniture are overcome, such as the tack of interaction between the steps, labor intensiveness, lack of repetitiveness and lack of standardization of the steps, lack of automation and adaptations which adversely affect precision, among others.

Having described an example of a preferred embodiment, it should be understood that the scope of the present invention encompasses other possible variations, being limited solely by the content of the claims, potential equivalents being included therein.

The invention claimed is:

1. An automated process for manufacturing items of furniture in an integrated manufacturing cell, wherein the process comprises the steps of:
    (a) initially machining a plate according to a manufacturing program so as to form an initially machined plate having, channels and holes therein as predetermined by the manufacturing program;
    (b) installing inserts in the holes of the initially machined plate that were generated by the machining step (a) and applying insert resin in at least one side hole of the installed inserts;
    (c) applying edging resin inside the channels of the initially machined plate that were generated by the machining step a);
    (d) curing in a heated environment the edging resin in the channels of the initially machined plate and the insert resin in the at least one side hole of the inserts to provide a resin cured furniture preform plate; and
    (e) conducting final machining of the furniture preform plate to thereby provide the item of furniture.

2. The process as claimed in claim 1, wherein the process further comprises prior to the machining step a), a step of:
    a1) preparing and loading in a supervisory system of the integrated manufacturing cell a manufacturing program comprising commands and parameters necessary to form the item of furniture.

3. The process as claimed in claim 2, wherein the process further comprises after step (a1) and prior to step (a), a step of:
    (a2) positioning the plate in the integrated manufacturing cell by referencing the plate with a vision system relative to a plurality of targets to obtain reference data, and updating the supervisory system and the manufacturing program with the obtained reference data.

4. The process as claimed in claim 3, wherein step (a) comprises prior to conducting the initial machining, a step of causing the supervisory system to issue a positional correction command to a robotic arm and altering the manufacturing program based on the positional correction command.

5. The process as claimed in claim 1, wherein after step (b) comprises forming at least two side holes in the plate at a side of the inserts after installing the inserts into the holes generated in the initial machining and then applying the insert resin into at least one of the two side holes.

6. The process as claimed in claim 1, wherein step (d) comprising curing the edging resin and the insert resin in an oven at a temperature in the range of 40° C. to 55° C. for 1 to 3 hours.

7. The process as claimed in claim 1, wherein step (e) comprises conducting final machining of one side of the furniture preform plate and then rotating the furniture preform plate in a transfer module and conducting final machining on another unmachined side thereof so that both sides of the furniture preform plate are finally machined.

8. The process as claimed in claim 7, wherein step (e) comprises after rotating the furniture preform plate following final machining of one side thereof a step of repositioning the furniture preform plate in the integrated manufacturing cell with the other unmachined side thereof facing upwards, referencing the position of the furniture preform plate with a vision system relative to a plurality of targets to obtain reference data, and updating the obtained reference data in the manufacturing program of the supervisory system.

9. The process as claimed in claim 8, wherein after the referencing of the furniture preform plate repositioned in the integrated manufacturing cell with the other unmachined side thereof facing upwards, the process comprises the following steps:
    (i) conducting further initial machining on the other unmachined side of the furniture preform plate to form secondary channels and holes therein,
    (ii) installing secondary inserts in the secondary holes generated in the further initial machining of the unmachined side of the furniture preform plate according to step (i) and applying secondary insert resin into at least one side hole of the secondary inserts,
    (iii) applying secondary edging resin inside the secondary channels generated during the further initial machining according to step (i), and
    (iv) curing the secondary edging resin and secondary insert resin.

10. The process as claimed in claim 1, wherein step (e) comprises conducting final machining of the cured edging resin in the channels.

11. The process as claimed in claim 9, wherein step (e) comprises conducting the final machining of the cured edging resin in the channels on both sides of the furniture preform plate.

12. An integrated manufacturing cell for manufacturing items of furniture, wherein the integrated manufacturing cell comprises:
- a machining station,
- a curing station, and
- a transfer module operatively associated with the machining station and the curing station for transferring a workpiece plate therebetween, wherein the machining station comprises:
  (i) a portico formed by vertical structures fastened to a manufacturing cell floor and horizontal structures perpendicularly associated with the vertical structures,
  (ii) a vacuum table fastened to the manufacturing cell floor which is positioned under the horizontal structures for receiving and fastening the workpiece plate, wherein
  (iii) the portico supports a robotic arm, a vision system, an insert manipulator, a machining mandrel, an insert resin applier and an edging resin applier.

13. The integrated manufacturing cell according to claim 12, further, comprising a supervisory system endowed with a manufacturing program, wherein the manufacturing program comprises command orders for all components of the integrated manufacturing cell that are sent by the supervisory system.

14. The integrated manufacturing cell as claimed in claim 12, wherein the vacuum table comprises a plurality of linear rulers that are parallel to one another, a plurality of vacuum nozzles installed on the linear rulers to fasten the workpiece plate to the vacuum table.

15. The integrated manufacturing cell as claimed in claim 12, wherein the portico further comprises a track and swivel joints, wherein the robotic arm is operatively connected to the track and swivel joints so as to be capable of simultaneous sideward and/or angular movements adjacent to the horizontal structures of the portico.

16. The integrated manufacturing cell as claimed in claim 15, Wherein the robotic arm comprises a grasping element, wherein the vision system, the insert manipulator, the machining mandrel, the insert resin applier and/or the edging resin applier are fastened to the grasping element.

17. The integrated manufacturing cell as claimed in claim 13, wherein the vision system comprises an identification system for identifying targets fastened to the workpiece plate to obtain target data from identified targets which are sent to the supervisory system to thereby alter the manufacturing program.

18. The integrated manufacturing cell as claimed in claim 12, wherein the insert manipulator comprises a base which includes a plurality of interconnected vacuum tips, wherein each vacuum tip is capable of transporting an insert from one tray of inserts to a hole in the workpiece plate by way of the robotic arm.

19. The integrated manufacturing cell as claimed in claim 18, which further comprises an insert assembly device that prepares a plurality of inserts on a plurality of insert trays and a guide track for providing the plurality of inserts on the plurality of insert trays disposed on the guide track to allow access by the insert manipulator.

20. The integrated manufacturing cell as claimed in claim 19, wherein the plurality of insert trays comprises a sensor a and a reader positioned in a region near a clamped end of the guide track for identifying the reader, wherein data received from the reader by the sensor are sent to the supervisory system.

21. The integrated manufacturing cell as claimed in claim 12, wherein the curing station comprises an oven which includes multiple drawers on which workpiece plates provided with resin are disposed for curing.

22. The integrated manufacturing cell as claimed in claim 21, wherein each of the multiple drawers comprises a flat steel sheet having a plurality of vacuum points to, fasten the workpiece plate on the steel sheet.

23. The integrated manufacturing cell as claimed in claim 21, wherein the transfer module is disposed between the machining station and the curing station, wherein the transfer module is formed by first and second frames, the first frame being disposed parallel under the a second frame, and wherein the second frame transfers a machined workpiece plate from the vacuum table to a respective one of the multiple drawers of the oven in the curing station.

24. The integrated manufacturing cell as claimed in claim 23, wherein the second frame transfers the workpiece plate from the respective one of the drawers to the first frame, the second frame being maintained in fastened connection to the workpiece plate such that the first frame, the workpiece plate and the second frame are in combination capable of being rotated 180°.

25. The integrated manufacturing cell as claimed in claim 24, wherein the first frame and the second frame include plurality of vacuum points that support the workpiece plate during transfer.

* * * * *